United States Patent Office 3,562,242
Patented Feb. 9, 1971

3,562,242
PROCESS FOR THE TREATMENT OF
POLYETHYLENE
Adrien Nicco, Bethune, and Bernard Lambert, Lens,
France, assignors to Ethylene-Plastique, Paris, France,
a French society
No Drawing. Filed Aug. 28, 1968, Ser. No. 755,780
Claims priority, application France, Sept. 14, 1967,
121,006
Int. Cl. C08f 29/04, 45/67
U.S. Cl. 260—94.9
5 Claims

ABSTRACT OF THE DISCLOSURE

A method of improving the optical properties of polyethylene which comprises incorporating an aluminium alcoholate into molten polyethylene, allowing the resulting mixture to solidify, and contacting the solidified mixture with an aqueous reagent at a temperature from 60° C. up to but not including the melting point of the polyethylene in the mixture.

---

This invention is concerned with the treatment of polyethylene to improve its optical properties.

In British specification No. 965,877 there is described and claimed a method for improving the dye affinity of homopolymers of olefins and copolymers of olefins with other ethylenically unsaturated monomers which comprises incorporating in the polymer an organo-metallic or organo-metalloid compound which is soluble therein to obtain a uniform dispersion of the compound throughout the mass of polymer and then decomposing the compound to give a volatile organic compound which is easily removed and a residue of a metal or metalloid oxide or hydroxide which remains in a finely divided and uniformly distributed state within the polymer, and which does not cause deterioration of the polymer.

We have now found that by incorporating an aluminium alcoholate in molten polyethylene and treating the resulting mixture, after solidification, with an aqueous reagent, the polyethylene containing decomposition products of the alcoholate obtained has better optical properties than the polyethylene starting material.

According to the present invention, therefore, we provide a method of treating polyethylene to improve its optical properties, which comprises forming a mixture of molten polyethylene and an aluminium alcoholate of the formula

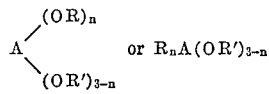

where R and R', which may be the same or different, are aliphatic radicals containing from 1 to 6 carbon atoms and $n$ is 1 or 2, allowing the resulting mixture to solidify and contacting the solidified mixture with an aqueous reagent at a temperature from 60° C. up to but not including the melting point of the polyethylene in the mixture.

The preferred alcoholates are the trialcoholates, particularly aluminium triisopropylate and aluminium triethylate, and the preferred aqueous reagent is water. The amount of aluminium alcoholate, calculated as the metal, which is added to the polymer is generally from 0.05 to 1% and preferably from 0.1 to 0.5%, based on the weight of the polyethylene.

We have found that the best results are obtained with polyethylene having a density of less than 0.94.

The minimum contact time between the water or other aqueous reagent and the mixture of polyethylene and alcoholate (or some of its decomposition products if the alcoholate has been partly decomposed on mixing with the melted polymer) depends on the size of the polymer particles (the solidified mixture is generally subdivided prior to aqueous treatment) and on the temperature at which the treatment is carried out. Thus, the minimum contact time necessary is shorter with powdered polymer than with granular polymer and similarly the minimum contact time necessary decreases as the treatment temperature rises, for example from 60° C. to 100° C.

It is essential that the polymer mixture remains in the solid state during the treatment with the aqueous reagent. Tests have shown that if the treatment is carried out under conditions in which the polyethylene is molten, e.g. at a temperature of 140° C., there is no improvement in the optical properties of the treated polyethylene. There is a similar lack of improvement if the treatment is carried out at a temperature below 60° C.

In order that the invention may be more fully understood, the following examples are given by way of illustration only.

EXAMPLE 1

18 g. of grade-2 polyethylene, density 0.922 (ASTM Standard 1505–57 T), obtained by high-pressure (HP) radical polymerisation were mixed for 10 minutes at 140° C. in a Brabender mixer. 0.72 g. of aluminium isopropylate was then introduced, corresponding to a metal content of 0.5% by weight of polymer. Mixing was continued for 10 minutes after the additive had been introduced to distribute the additive uniformly in the polymer. The polyethylene was taken out of the mixer, allowed to cool, and crushed in a Wiley-Thomas grinder fitted with a grid having 2 mm. meshes.

Samples of the resulting powder were contacted with 20 ml. water at 95° C. for periods of 5, 10 and 20 minutes respectively. After drying in vacuo, the samples were compressed into sheets at 120° C. after remaining for 5 minutes at 160° C. in a molten state. The pressure applied was 20 metric tons for 250 cm.² surface. The sheets were then cooled under pressure to ambient temperature in about 5 minutes.

Optical measurements to ASTM Standard D 1003–61 were made with a Gardner pivotable sphere haze-meter on the resulting sheets, which were 650μ thick. Measurements were made of the total light transmitted T and the diffused light D, after which calculations were made of the transparency T—D and the cloudiness D/T (T, D, and T—D are expressed as a percentage of the total light when the specimen is not used).

The following results were obtained for the specimen which had been in contact with water at 95° C. for 5 minutes:

$T=85$, $D=9.5$, $T-D=75.5$, $D/T=0.11$

The sample which had been in contact with water at 95° C. for 10 minutes gave the following results:

$T=85.5$, $D=9$, $T-D=76.5$, $D/T=0.10$

The sample which had been in contact with water at 95° C. for 20 minutes gave the following results:

$T=85$, $D=10.5$, $T-D=74.5$, $D/T=0.12$

These results show that the hydrolysis was effective after 5 minutes.

Comparative tests were made, with the following results:

(a) The same HP polyethylene (without filler) gave the following results when it had not been mixed:
$T=82$, $D=73$, $T-D=9$, $D/T=0.90$, thickness of sheet=620μ.

(b) The same HP polyethylene (without filler) gave the following results after mixing:

$T=79$, $D=47$, $T-D=32$, $D/T=0.60$, thickness of sheet=650µ.

(c) The same HP polyethylene (without filler), after mixing and treatment with water for one hour at 95°, gave the following results:

$T=78$, $D=51$, $T-D=27$, $D/T=0.65$, thickness of sheets 730µ.

(d) The same HP polyethylene (with filler) gave the following results after mixing and after the additive had thermally decomposed in the mixer for 15 minutes at 190° C.:

$T=82$, $D=47$, $T-D=35$, $D/T=0.57$, thickness of sheet=640µ.

Comparative tests (a), (b) and (c) show that, without an additive, the optical properties of the samples are inferior to those treated in accordance with the invention. Comparative test (d) shows that thermal decomposition unlike hydrolysis, does no improve the optical properties.

EXAMPLE 2

A grade-2 polyethylene of density 0.918, obtained by HP radical polymerisation and filled with aluminium isopropoxide (0.5% of metal), was processed by mixing under the same conditions as in Example 1.

A hydrolysis test was carried out in the mixer by slowly adding 20 cc. of water over a period of 15 minutes during mixing, the polymer being in the molten state at 140° C. as in Example 1, the solidified material was ground and made into a sheet 550µ thick, with the following results:

$T=81$, $D=37$, $T-D=44$, $D/T=0.45$

The same polyethylene (with filler, not hydrolysed, ground, left in contact with water for one hour at 95° C., and made into a sheet 630µ thick) gave the following results:

$T=84$, $D=9$, $T-D=75$, $D/T=0.11$

This example shows that hydrolysis of the isopropylate filler with the polymer in the molten state gives greatly inferior optical properties than those obtained by hydrolysis with the polymer in the solid state.

EXAMPLE 3

5 kg. of a grade-7 HP polyethylene, density 0.921 melting point 108° C., obtained by radical polymerisation was mixed in an internal mixer with aluminium isopropylate (0.5% metal by weight of polyethylene). The substance taken from the mixer was solidified and cut into chips by grinding in a Lancelin grinder. The chips were then pressed together and drawn out into a flat film 100µ thick.

Hydrolysis tests were made on the film at different temperatures and for various periods, with water or water+2-ethoxyethanol (10–90). The films were dried in vacuo and moulded into sheets from 500 to 600µ thick. The following values of T, D, $T-D$, and $D/T$ were obtained:

(a) Film in contact with water at 25° C. (a temperature below the preferred region):

for 30 minutes: $T=78.5$, $D=29$, $T-D=49.5$, $D/T=0.37$, thickness of sheet 660µ for 24 hours: $T=78$, $D=22$, $T-D=56$, $D/T=0.8$, thickness of sheet=640µ

Longer periods of 48, 72, 96 and 120 hours gave the following values for the transparency $T-D$: 51, 49, 55 and 45%, for sheets having the following thickness respectively: 600, 630, 600 and 630µ.

(b) Film in contact with water at 60° C.:

for 1 minute: $T=80$, $D=25$, $T-D=55$, $D/T=0.31$, thickness of sheet=510µ for 30 minutes: $T=80$, $D=20$, $T-D=60$, $D/T=0.25$, thickness of sheet=550µ

(c) Film in contact with water at 80° C.:

for 1 minute: $T=82$, $D=20$, $T-D=62$, $D/T=0.24$, thickness of sheet=490µ for 30 minutes: $T=80$, $D=15$, $T-D=65$, $D/T=0.18$, thickness of sheet=490µ

(d) Film in contact with water at 95° C.:

for 1 minute: $T=80$, $D=12$, $T-D=68$, $D/T=0.15$, thickness of sheet=540µ for 30 minutes: $T=80$, $D=11$, $T-D=69$, $D/T=0.4$, thickness of sheet=470µ

(e) Film in contact with water for 4 minutes at 105° C.:

$T=83$, $D=11$, $T-D=72$, $D/T=0.13$, thickness of sheet=610µ

$T=84$, $D=9$, $T-D=75$, $D/T=0.11$, thickness of sheet=570µ

(f) Treatment at temperature above melting point. 4 minutes at 112–113° C.:

$T=82.5$, $D=45.5$, $T-D=37$, $D/T=0.55$, thickness of sheet=570µ

4 minutes at 120° C.:

$T=76$, $D=75$, $T-D=1$, $D/T=0.90$, thickness of sheet=560µ

(g) Contact with water+2-ethoxyethanol (wetting agent) at 95° C.:

1 minute: $T=79$, $D=73$, $T-D=66$, $D/T=0.6$, thickness of sheet=490µ

30 minutes: $T=81$, $D=21$, $T-D=60$, $D/T=0.25$, thickness of sheet=570µ.

In this example, (a) shows that hydrolysis at 25° is very inadequate, even after very long periods; (b), (c), (d) and (e) show that the optical properties improve when the temperature rises towards the melting point; (f) shows that the optical properties deteriorate considerably above the melting point, and (g) shows that treatment with water +2 ethoxyethanol takes rather longer than with water alone.

EXAMPLE 4

(a) A grade-2 HP polyethylene of density 0.933, obtained by radical polymerisation, was processed as in Example 1 with increasing amounts of additive. The content of additive is expressed as a percentage of metal by weight with respect to the polymer. Hydrolysis was carried out at 95° C. for one hour on the product after grinding.

The following optical properties were obtained for different proportions of additive:

| Content | T | D= | T—D= | D/T | Thickness of sheet, µ |
|---|---|---|---|---|---|
| 0 | 81 | 59 | 22 | 0.71 | 690 |
| 0.025 | 84 | 39 | 45 | 0.35 | 530 |
| 0.25 | 83 | 12 | 71 | 0.14 | 700 |
| 0.5 | 83 | 9 | 74 | 0.11 | 710 |
| 0.65 | 83 | 11 | 72 | 0.12 | 710 |

(b) The test was repeated with grade-2 HP radical polyethylene of density 0.922. The following optical properties were observed for various proportions of additive:

| Thickness of sheet, µ | Content | T | D | T—D | D/T |
|---|---|---|---|---|---|
| 650 | 0 | 79 | 47 | 32 | 0.6 |
| 650 | 0.025 | 84 | 36 | 48 | 0.43 |
| 530 | 0.05 | 84 | 16 | 68 | 0.18 |
| 500 | 0.1 | 82.5 | 10 | 72.5 | 0.12 |
| 690 | 0.25 | 84 | 12 | 72 | 0.14 |
| 630 | 0.5 | 84 | 9.5 | 74.5 | 0.11 |
| 670 | 0.65 | 84 | 12 | 72 | 0.14 |
| 650 | 1 | 80 | 17 | 63 | 0.21 |

The above tests show that the optical properties improve when the content of additive rises to 0.25%. Only a small improvement results if the content of additive is further increased.

(c) If very finely-powdered chromatographic alumina or alumina reprecipitated from aluminum isopropylate is directly introduced into the polymer, the results are insignificant. This is shown by the following two tests:

Introduction of 0.5% (metal) of chromatographic alumina:

$T=79$, $D=47$, $T-D=32$, $D/T=0.60$, thickness of sheet $=690\mu$

Introduction of 0.5% (metal) of reprecipitated alumina:

$T=79$, $D=49$, $T-D=30$, $D/T=0.38$, thickness of sheet $=690\mu$.

EXAMPLE 5

A grade-2 polyethylene, density 0.922, obtained by HP radical polymerisation was processed with various aluminium alcoholates as in Example 1. The resulting blend, after being crushed into particles less than 2 mm. in size, was hydrolysed for one hour at 95° C. It was then moulded into sheets, as in the previous examples, and optical measurements were made on the sheets.

The following results were obtained with aluminium trimethylate corresponding to the introduction of 0.4% metal by weight of polymer:

Before hydrolysis:

$T=83$, $D=43$, $T-D=40$, $D/T=0.52$, thickness of sheet $=510\mu$

After hydrolysis:

$T=81$, $D=33$, $T-D=48$, $D/T=0.41$, thickness of sheet $=600\mu$

The following results were obtained with triethoxy aluminium corresponding to the introduction of 0.3% metal by weight with respect to the polymer:

Before hydrolysis:

$T=82.5$, $D=41$, $T-D=41.5$, $D/T=0.50$, thickness of sheet$=630\mu$

After hydrolysis:

$T=85$, $D=8$, $T-D=77$, $D/T=0.1$, thickness of sheet $=560\mu$

The following results were obtained under the same conditions, using diethyl ethoxy aluminium:

After hydrolysis:

$T=83$, $D=10.5$, $T-D=72.5$, $D/T=0.13$, thickness of sheet$=730\mu$

The following results were obtained with tributoxy aluminium corresponding to the introduction of 0.2% metal by weight of polymer:

Before hydrolysis:

$T=81.5$, $D=47.5$, $T-D=34$, $D/T=0.58$, thickness of sheet$=620\mu$

After hydrolysis:

$T=81$, $D=14.5$, $T-D=66.5$, $D/T=0.17$, thickness of sheet$=690\mu$

The same polyethylene without filler, when treated with water for one hour at 95° C., gave the following results:

$T=78$, $D=51$, $T-D=27$, $D/T=0.65$, thickness of sheet $=730\mu$

This example shows that triethoxy aluminium gives results which are as good as those from a similar content of aluminium isopropylate.

EXAMPLE 6

A grade-2 polyethylene of density 0.922, obtained by HP radical polymerisation, was processed as in Example 1 with aluminium triisopropylate in an amount corresponding to the introduction of 0.25% metal into the polymer.

(a) This test shows the effect of prolonged mixing before hydrolysis. After mixing at 140° C. for 10 minutes, the following optical properties were obtained:

$T=82$, $D=41$, $T-D=41$, $D/T=0.5$, thickness of sheet $=630\mu$

The substance was mixed for a further 15 minutes at 140° C., still without hydrolysis, and then for a further 15 minutes, with the following results:

$T=86$, $D=43$, $T-D=43$, $D/T=0.5$, thickness of sheet $=570\mu$ and $T=84$, $D=47$, $T-D=37$, $D/T=0.59$, thickness of sheet $=640\mu$ (b) This test shows the retention of optical properties after a number of processing cycles. The polyethylene, after mixing with aluminium isopropylate, was ground and hydrolysed for one hour at 95° C. and the following results were obtained:

$T=84$, $D=12$, $T-D=72$, $D/T=0.14$, thickness of sheet $=690\mu$

The resulting substance was first mixed for a further 15 minutes at 140° C. The following optical properties were obtained from sheets $550\mu$ thick:

$T=89$, $D=25$, $T-D=64$, $D/T=0.28$

After mixing for a further 15 minutes at 140° C., the following results were obtained for a sheet of the same thickness:

$T=86$, $D=22$, $T-D=64$, $D/T=0.25$

In this example, (a) shows that prolonged mixing of the product and filler before hydrolysis does not result in a corresponding improvement in optical properties; and (b) shows that the improvement in optical properties persists after several mixing cycles when the ground product is hydrolysed.

EXAMPLE 7

A grade-2 polyethylene, density 0.922, obtained by HP radical polymerisation, was mixed with aluminium isopropylate in an amount corresponding to the introduction of 0.25% metal into the polymer. The substance had the following mechanical properties:

|  | Young's modulus kg./cm.$^2$ |
|---|---|
| (1) Without filler, mixed under the operation conditions for preparing the mixture | 1,450 |
| (2) Without filler, mixed, ground, and treated with water at 95° C. for one hour | 1,350 |
| (3) With the equivalent of 0.25% metal as filler, before hydrolysis | 1,500 |
| (4) After hydrolysis | 1,700 |

A differential thermal analysis made on the aforementioned HP polymer (on a Perkins apparatus at a cooling rate of 32° C. per minute) showed that hydrolysis resulted in a considerable alteration in crystalline structure.

If $Tp$ and $Tc$ respectively are the peak temperature and the temperature at which recrystallisation begins in the graph relating variations in heating to the temperatures in the melting-recrystallisation cycle, the following values are obtained:

|  | Tp, °C. | Tc, °C. |
|---|---|---|
| Unmixed polymer, without filler | 72.6 | 82.8 |
| Mixed polymer, without filler | 79 | 86.4 |
| Polymer containing the equivalent of 0.5% metal as filler, before hydrolysis | 79.3 | 85.6 |
| Polymer containing the equivalent of 0.5% metal as filler, after hydrolysis | 82 | 96.7 |

A grade-7 HP polyethylene, of density 0.921, containing aluminium isopropylate as filler, had the following mechanical properties:

|   | Young's modulus kg./cm.$^2$ |
|---|---|
| (5) Without filler, mixed | 1,470 |
| (6) In contact with water at 95° C. for 1 hour | 1,350 |
| (7) Containing the equivalent of 0.25% metal as filler, before hydrolysis | 1,390 |
| (8) Containing the equivalent of 0.25% metal as filler, after hydrolysis | 1,490 |
| (9) Containing the equivalent of 0.5% metal as filler, after hydrolysis | 1,600 |

This example shows that the process of the invention leads to an increase in the Young's modulus as well as an improvement in optical properties.

We claim:

1. A method of treating polyethylene to improve its optical properties, which comprises forming a substantially water-free mixture of molten polyethylene having a density of less than 0.94 and an aluminum alcoholate of the formula:

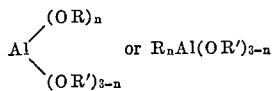

in which R is an aliphatic radical containing from 1 to 6 carbon atoms, R' is an aliphatic radical containing from 1 to 6 carbon atoms, and $n$ is 1 to 2, allowing the resulting mixture to solidify and contacting the solidified mixture with an aqueous reagent at a temperature from 60° C. up to but not including the melting point of the polyethylene in the mixture.

2. The method according to claim 1 in which the aluminum alcoholate is aluminum triisopropylate or aluminum triethylate.

3. A method according to claim 1 in which the mixture contains from about 0.05 to 1 percent of the aluminum alcoholate calculated as the metal and based on the weight of the polyethylene.

4. The method according to claim 1 in which the mixture contains from about 0.5 to 1 percent of the aluminum alcoholate calculated as the metal and based on the weight of the polyethylene.

5. The method according to claim 1 wherein the aqueous reagent is water.

References Cited

UNITED STATES PATENTS

| 3,226,351 | 12/1965 | Werber et al. | 260—29.6 |
| 3,299,029 | 1/1967 | Binsbergen et al. | 260—93.7 |
| 3,355,402 | 11/1967 | Sasaki et al. | 260—23 |

FOREIGN PATENTS

| 965,877 | 8/1964 | Great Britain | 260—949 |

JOSEPH L. SCHOFER, Primary Examiner

S. M. LEVIN, Assistant Examiner

U.S. Cl. X.R.

260—88.2, 93.7

UNITED STATES PATENT OFFICE
CERTIFICATE OF CORRECTION

Patent No. 3,562,242     Dated February 9, 1971

Inventor(s) Adrien Nicco and Bernard Lambert

It is certified that error appears in the above-identified patent and that said Letters Patent are hereby corrected as shown below:

Column 1, line 52, the first formula should be written

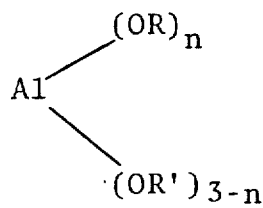

and the second formula should be written

Column 3, line 64 -- "D/T=0.8" should read --D/T=0.28--.

Column 4, line 10 -- "D/T=0.4" should read --D/T=0.14--.

Signed and sealed this 15th day of June 1971.

(SEAL)
Attest:

EDWARD M. FLETCHER, JR.
Attesting Officer

WILLIAM E. SCHUYLER, J
Commissioner of Patent